Feb. 21, 1950　　　　　　　M. LANG　　　　　　　2,498,128
APPARATUS FOR ELECTROPLATING WORKPIECES
Filed April 13, 1946　　　　　　　　　　　　　6 Sheets-Sheet 1

INVENTOR
MATTHEW LANG
BY
Toulmin & Toulmin
ATTORNEYS

Feb. 21, 1950 M. LANG 2,498,128
APPARATUS FOR ELECTROPLATING WORKPIECES
Filed April 13, 1946 6 Sheets-Sheet 2

INVENTOR
MATTHEW LANG
BY
Toulmin & Toulmin
ATTORNEYS

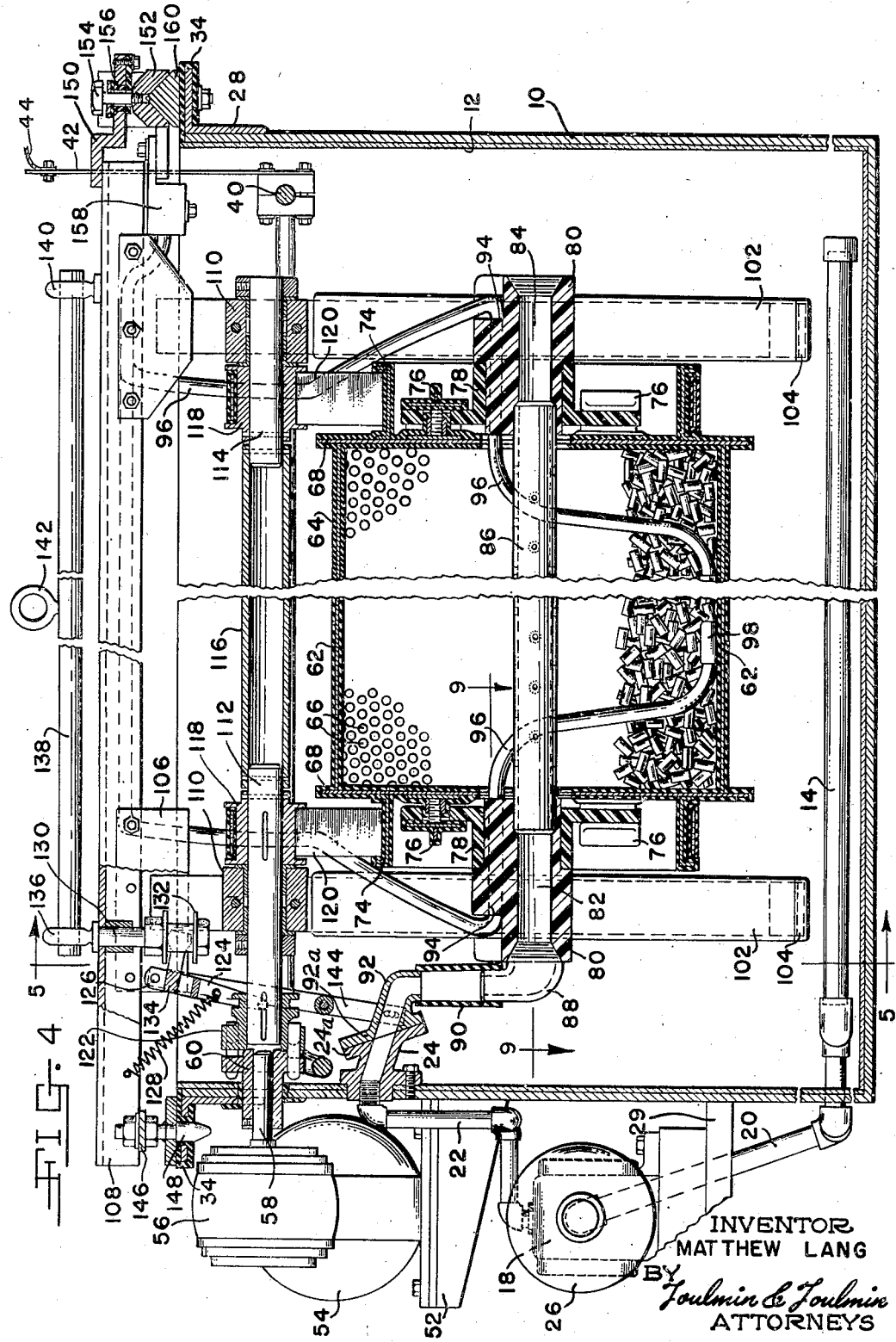

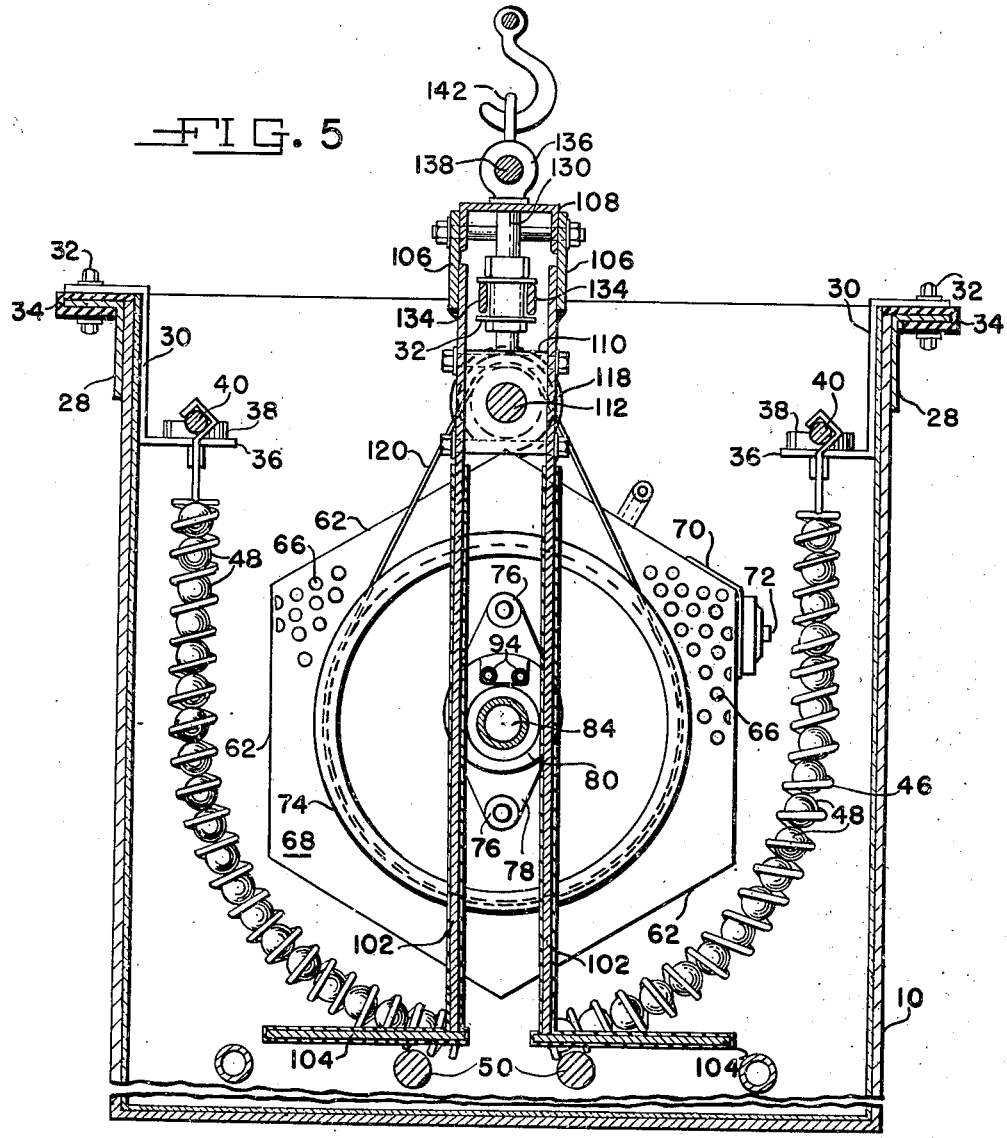

Feb. 21, 1950     M. LANG     2,498,128
APPARATUS FOR ELECTROPLATING WORKPIECES
Filed April 13, 1946     6 Sheets-Sheet 5
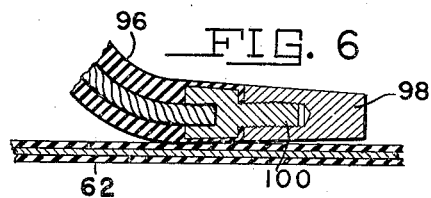
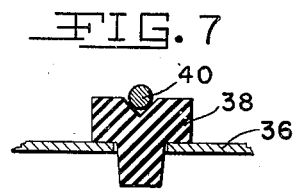
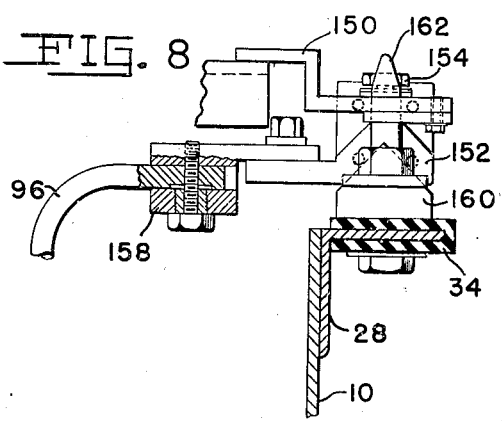
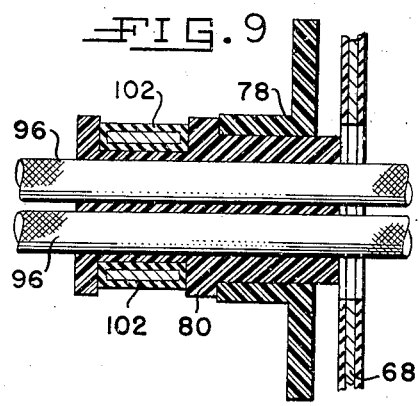
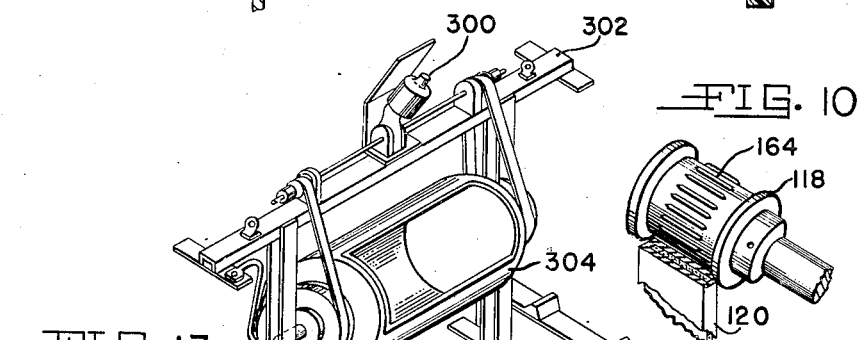
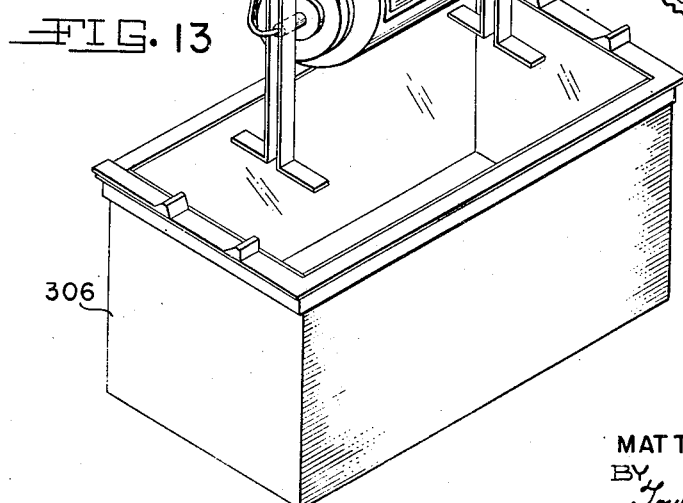
INVENTOR
MATTHEW LANG
BY
*Toulmin & Toulmin*
ATTORNEYS Feb. 21, 1950 M. LANG 2,498,128
APPARATUS FOR ELECTROPLATING WORKPIECES
Filed April 13, 1946 6 Sheets-Sheet 6
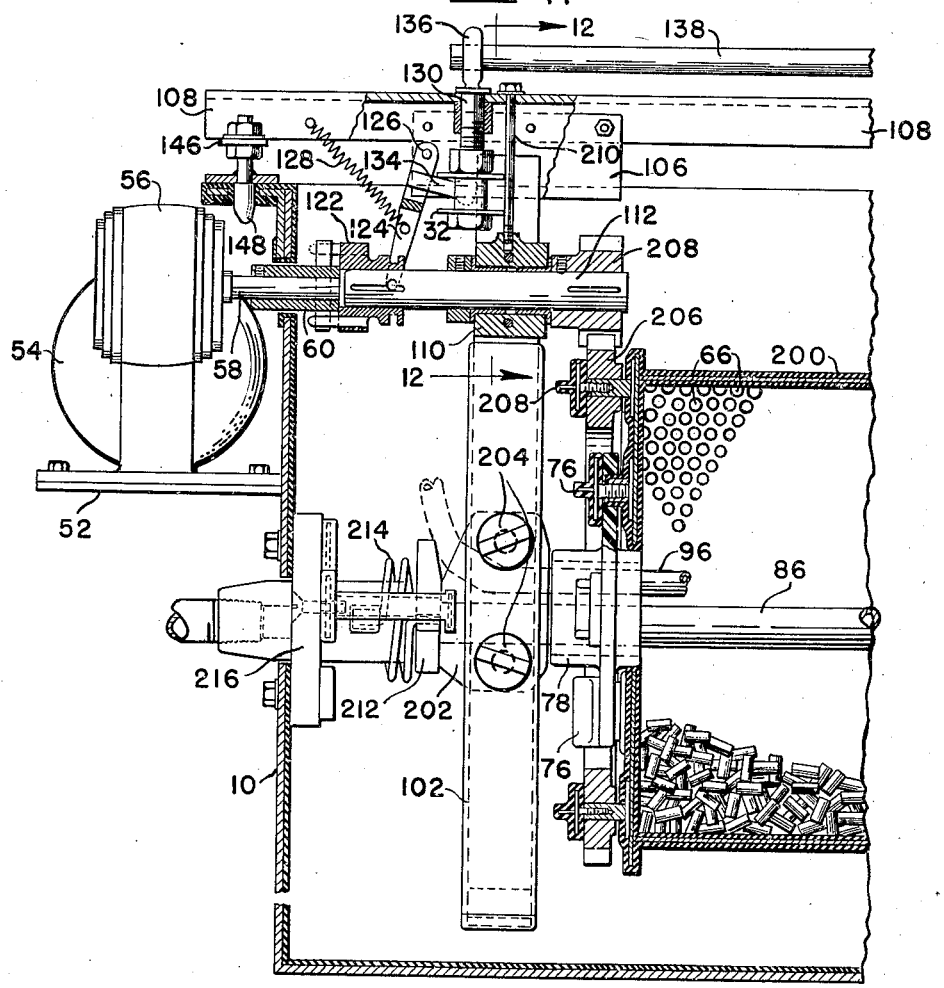
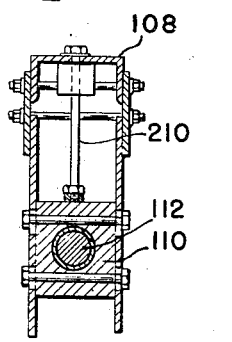
INVENTOR
MATTHEW LANG
BY
Toulmin & Toulmin
ATTORNEYS Patented Feb. 21, 1950

2,498,128

UNITED STATES PATENT OFFICE 2,498,128

APPARATUS FOR ELECTROPLATING WORKPIECES

Matthew Lang, Detroit, Mich., assignor to Frederic B. Stevens, Inc., Detroit, Mich., a corporation of Michigan Application April 13, 1946, Serial No. 661,998

6 Claims. (Cl. 204—213)

This invention relates to method and apparatus for processing workpieces and, particularly, to method and apparatus for electroplating workpieces.

The particular object of this invention is to provide improved means for handling small workpieces which must be plated in quantity in order to maintain the requisite production rate.

Another object is to provide apparatus for processing workpieces in which the workpieces may be moved bodily through the several steps of a process, such as cleaning, pickling, plating and washing without removing the workpieces from their container.

Still another object is to provide an apparatus for processing workpieces through a plurality of baths in which the workpieces are carried in a revolving workpiece holder which is transferred from tank to tank, the several tanks each containing the proper solution for performing a particular step in the process.

A further object is to provide an arrangement for supporting and rotating the workpiece holding barrel so that it may be removed bodily from a plating or processing tank.

A still further object is to provide a processing or electroplating arrangement in which there is a tank and a removable workpiece holding barrel in which the electrical connections to the workpieces are automatically made when the barrel is placed in the tank.

Still another object is to provide an improved means of protecting a processing tank from the influence of the solution therein and the plating current which flows through the solution.

Another object is to provide an improved means for circulating processing fluid or electrolyte through the workpieces in an arrangement according to the foregoing objects.

These and other objects and advantages will become more apparent upon reference to the following description and the accompanying drawings in which:

Figure 4 is a vertical longitudinal section taken on the line 4—4 of Figure 1;

Figure 5 is a transverse section taken substantially on the line 5—5 of Figure 4;

Figure 6 is a fragmentary view showing the construction of the electrode which conducts electricity to the workpieces;

Figure 7 is a fragmentary view showing one of the insulating pads which supports an electrode within the tank;

Figure 8 is a section taken substantially along the line 8—8 of Figure 1 and shows the arrangement for making contact with the cables that lead to the workpiece;

Figure 9 is a section taken substantially along the line 9—9 of Figure 4 and shows the journal upon which the workpiece holding barrel is rotatable;

Figure 10 is a perspective view showing one of the drive pulleys which supports and rotates the workpiece holding barrel;

Figure 11 is a fragmentary view of a modified construction in which the workpiece holding barrel is driven by gears;

Figure 12 is a section taken on the line 12—12 of Figure 11 and shows the support and adjustment for the drive shaft which mounts the drive pinion; and Figure 13 is a perspective view showing the modified arrangement wherein the drive motor for the workpiece holding barrel is carried on the barrel supporting frame.

General arrangement

Figure 1:
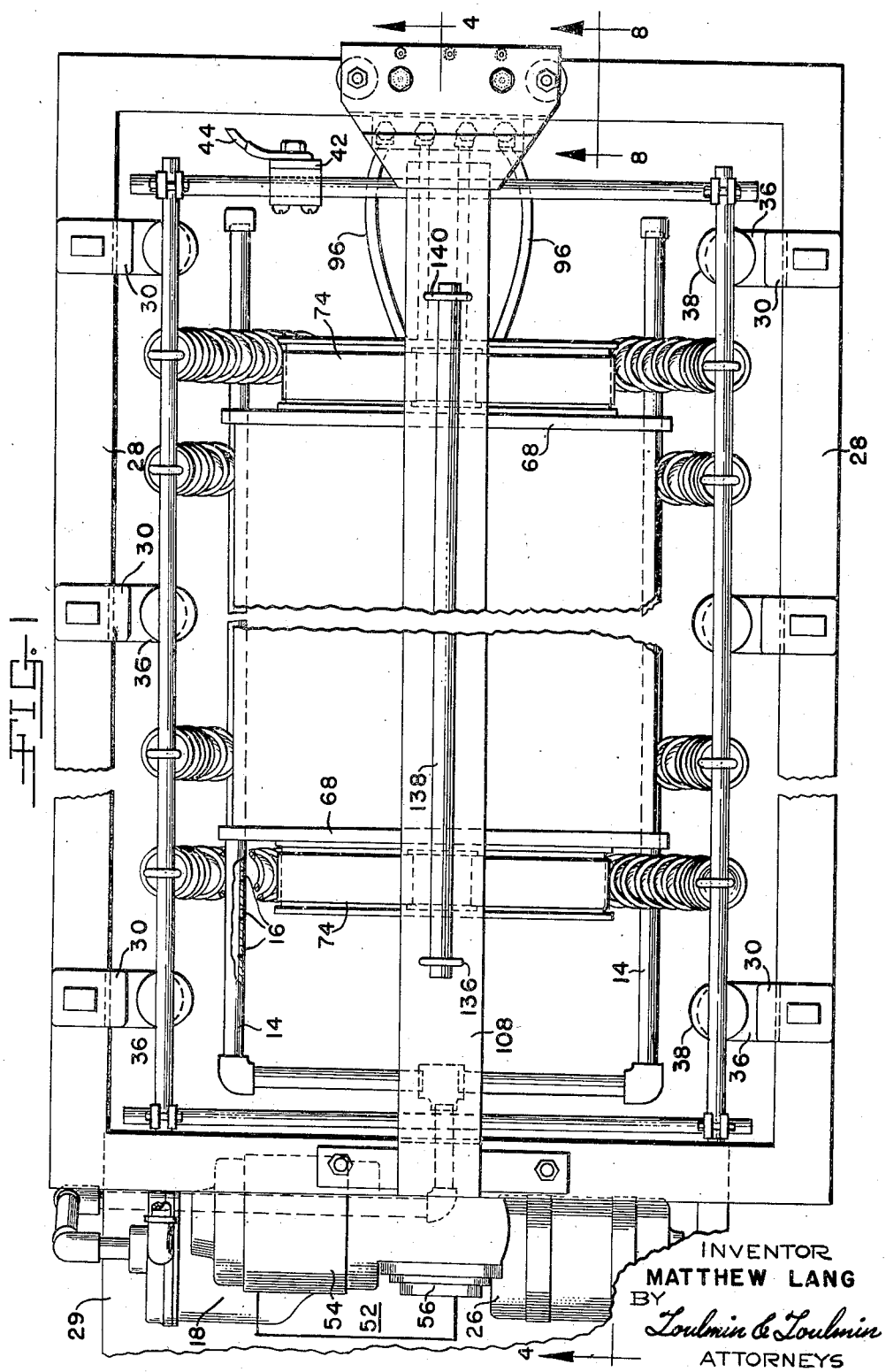
Figure 1 is a plan view of a processing tank constructed according to this invention.
Figure 2:
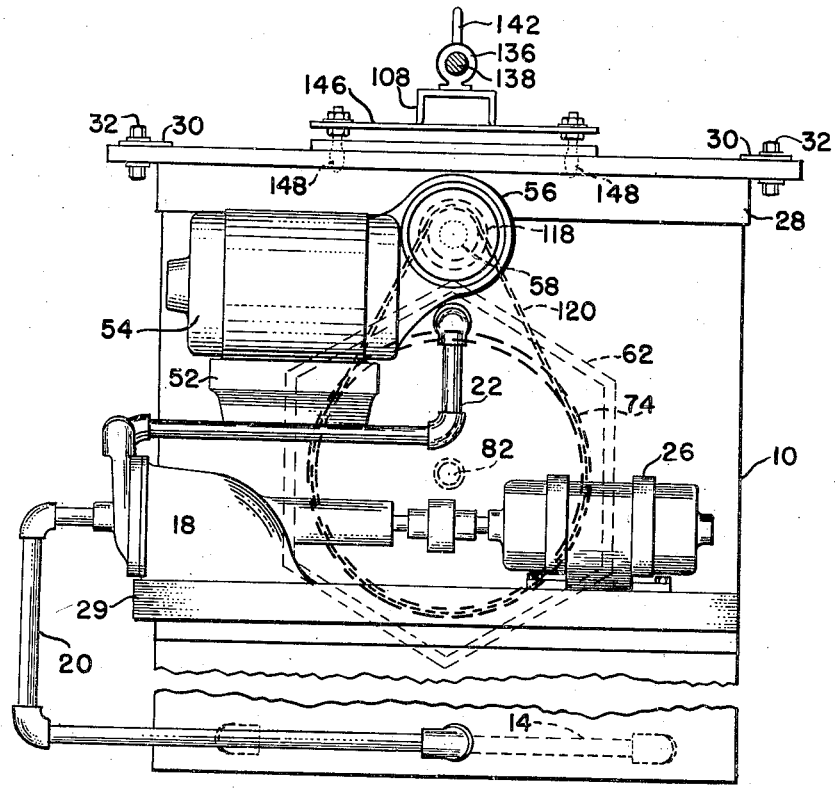
Figure 2 is an end view looking from the left side of Figure 1.

According to this invention there is provided a tank for holding processing solution such as a pickling bath or electrolyte. Associated with the tank is a pump and drive motor therefor by means of which the solution may be drawn from a lower level in the tank and recirculated in the tank at a higher level. Preferably, this circulation of the solution is continuous and means are provided for preventing the splashing of the electrolyte when the workpiece holding barrel is removed. The tank is preferably lined with a suitable corrosion resistant insulating compound such as rubber but may, in certain instances, comprise sheets of glass ceramic or other corrosion resistant insulating substance which are loosely fitted together and which, it has been found, afford ample protection for preventing corrosion or plating out on the tank.

There is also provided a barrel for receiving workpieces which is preferably a polygon in cross-section and which is rubber covered and which is apertured with a plurality of holes small enough to prevent the workpieces from passing therethrough but large enough to provide free flow of the solution through the barrel. The barrel has a cover which may be fastened in place so that once the workpieces are placed therein, the barrel may be rotated without the workpieces falling out. The straight sides of the barrel toss or roll the workpieces over and over as the barrel rotates so that the cleaning or plating solution has access to every portion of the surface thereof.

Associated with the barrel is a frame which comprises spaced legs between which the barrel is received and which are connected with a horizontal supporting member that rests on the opposite upper edges of the tank. The legs extend below the barrel but not to the bottom of the tank so that when the barrel is in the tank it is suspended from the upper edge thereof and when it is removed from the tank it can be set on the floor to be supported by the legs of the frame.

The frame includes a countershaft which may mount pulleys or gears for driving the barrel in rotation. When pulleys are provided there are belts which pass over the pulleys and under pulleys attached to the barrel so that the said barrel is simultaneously supported and rotated by the drive pulleys. When gears are provided on the counter-shaft, the barrel is secured to the legs and the counter-shaft gears merely rotate the said barrel.

The barrel is journaled at either end on electrical insulating bushings which, it has been found, may advantageously be constructed from a plastic material such as polystyrene. These polystyrene bushings not only journal the barrel but also provide a mounting for a solution circulating pipe and means of access for electrodes to make contact with the workpieces within the barrel.

The aforementioned solution circulating pipe opens through one of the bushings and has connected therewith a fitting adapted for engagement with the discharge fitting at the upper level in the tank. When the barrel is placed in the tank for a work cycle, the aforementioned fittings are placed in engagement and the solution is circulated from the lower level in the tank back to the tank through the circulating pipe in the workpiece holding barrel.

For driving the aforementioned counter-shaft there is provided a motor which is preferably mounted on the tank and whose drive shaft extends into the tank and mounts a clutch half which is adapted for engagement with another clutch half carried on the countershaft. When the barrel is lowered into the tank the clutch halves automatically engage to give a driving engagement between motor and the countershaft and, when the barrel is lifted from the tank, the clutch halves automatically disengage.

In a plating arrangement, the tank includes a bus bar which extends around the tank and which is supported on the tank by means of brackets and insulating pads. Suspended from the bus bar are the anodes which may comprise solid members or which may comprise open tubes within which are placed slugs or bars of the material to be plated onto the workpieces. The workpieces are preferably engaged by a plurality of flexible cables or danglers which pass through the bushings and whose ends extend into the workpieces. The other ends of these cables are connected with a contact block carried by the supporting member of the barrel supporting frame and which is electrically insulated from the said frame. This block makes contact with another block which is carried on the tank but insulated therefrom so that when the barrel is lowered into the tank a connection is automatically established between the block on the tank and the workpieces. By connecting a suitable source of electrical energy, such as a plating generator, between the bus bar within the tank and the block carried on the tank, a circuit may be established which, when the tank is filled with the proper solution and the proper anode material is provided, will affect the plating of the workpieces.

Means are provided, such as aligning studs, for properly locating the barrel supporting frame and, therefore, the barrel when the assembly is lowered into the tank so that the electrical connections are properly made and so that the clutch halves and the fittings in the solution circulating system are properly engaged.

Optionally, the drive motor for the barrel may be carried on the barrel supporting frame so that the solution tank need only comprise anode supporting means and the necessary electrical connections for completing the plating circuit.

Structural arrangement

Referring to the drawings and particularly to Figures 1 through 4, there is illustrated a tank at 10 for containing the processing solution or, as in this case, an electrolyte. The tank 10 is protected against the corrosive influence of the electrolyte by a lining material at 12 which may comprise a rubber coating but which is here shown as consisting of glass sheets. The glass sheets are placed in the tank to lie against the wall and are retained in position by any suitable fastening means. While this does not exclude the solution from contact with the tank walls as does a seamless rubber covering, it has been found in many instances the protection afforded by the glass lining is adequate and represents an easy manner of preparing an ordinary tank for an electroplating process.

The tank has adjacent its bottom a pipe 14 which preferably comprises a pair of branch pipes which are suitably apertured as at 16 to draw the electrolyte from the tank due to the suction of the pump 18 which is connected with the said pipes by a conduit 20. The pump has a discharge opening which is connected by the conduit 22 with a fitting 24 at a higher level in the solution tank. The pump is driven by a motor 26 and the pump and motor are mounted together on a bracket 29 that is preferably attached to one of the end walls of the tank.

Figure 3:
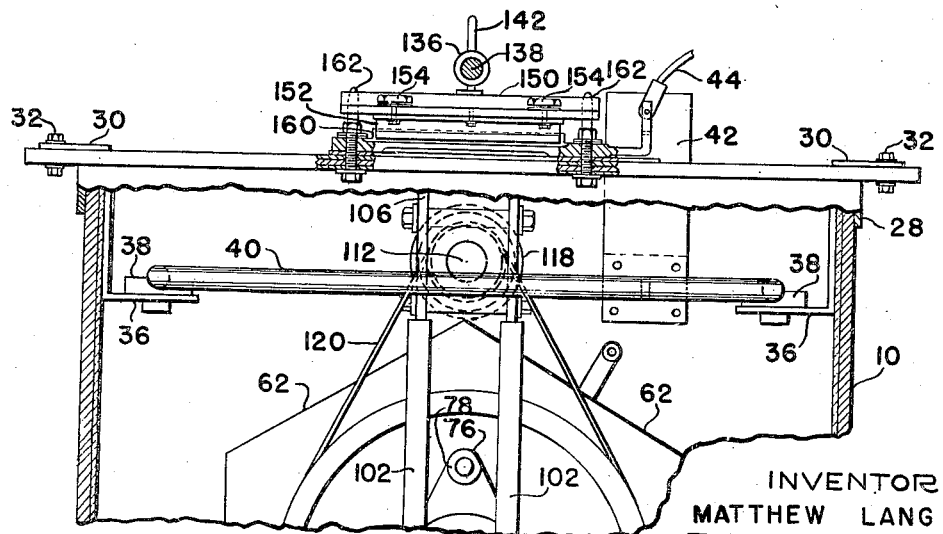
Figure 3 is an end view partly in section looking from the right end of Figure 1.

The tank preferably has a stiffening flange as at 28 around the upper edge thereof which also provides a support for suspending the barrel within the tank and for the brackets which carry the anode bus bar. These brackets are indicated by the numeral 30. In Figures 1, 3 and 5 these brackets 30 are secured to the flange by any suitable means such as the bolts 32. For preventing electrical contact between the tank flange and any of the parts adjacent thereto, the extending edge of the flange is preferably coated with rubber-like insulating material as at 34.

The brackets 30 are angular members which form a ledge as at 36 within the tank. The brackets may be stiffened by any suitable means, if found necessary, and have their portions 36 apertured for receiving an insulating pad 38, best seen in Figure 7, which is grooved to receive the anode bus bar 40. The anode bus bar may comprise a bent rod or may consist of straight rods fastened together with connectors at the corner as shown in Figure 1. At one end of the tank the anode bus bar 40 has connected therewith an upstanding plate 42 to which a cable 44 is connected so that electrical connections may be such that electricity can be conducted to the said anode bus bar.

The anode bus bar 40 supplies electrical current to suitable anode material positioned within the tank which is to be plated out on the workpieces carried in the barrel to be described hereinafter. The anodes may take any form which is found suitable but it is preferred to use the spiral container indicated at 46 in Figure 5 for holding balls of the anode material, these balls being indicated by the numeral 48. The containers 46 are roughly shaped to the contour of the work holding barrel and preferably have their lower ends supported as by a framework 50 adjacent the lower surface of the solution tank. The anode containers 46 are suspended from the anode bus bar 40 and may be arranged in any manner which is found most advantageous, this probably being with the anode containers spaced along the anode bar in order to effect substantially uniform distribution of the anode material around the workpiece carrying barrel.

One end of the tank also mounts a bracket 52 that supports a motor 54 that preferably includes the reduction gearing 56 from which extends the drive shaft 58 through the adjacent wall of the tank. Connected with the end of the drive shaft in the tank is a clutch member 60 which is adapted for engagement with a mating clutch half to be described hereinafter in connection with the workpiece holding barrel and its supporting frame.

Referring to the workpiece holding barrel and its supporting frame, the barrel itself preferably comprises a hexagonal metal frame which is covered with rubber or a rubber-like insulating material and which is perforated to allow the free flow of electrolyte therethrough. The metal frame is indicated at 62, the rubber covering at 64 and the perforations at 66. The ends of the barrel are closed by the rubber covered plates 68 which also are preferably perforated similarly to the side walls of the barrel. The barrel is closed by a lid 70 which forms one side of the said barrel and which is attached to the barrel by the rubber covered screws 72. The barrel thus forms a complete enclosure for workpieces with free access thereto of the solution within the tank while the aforementioned lid or cover provides means for inserting or removing workpieces from the barrel.

In the preferred modification of this invention, the end plates 68 of the barrel have attached thereto or, preferably, integral therewith the rubber covered pulleys 74 which at one time support the barrel and drive it in rotation. The end plates 68 have secured thereto, as by the rubber covered screws 76, a flanged sleeve 78 of electrical insulating and corrosion resistant material. While any substance having sufficient strength and requisite properties of resistance to corrosion and electrical resistance may be employed for this purpose, it has been found that polystyrene is eminently satisfactory, being relatively inexpensive, easy to work and having long life in the presence of various acid and alkali baths.

The sleeves 78 each receive a bushing 80 also of polystyrene and at least the left-hand one of which has a passage 82 therethrough. The right-hand one of the sleeves 78 has at least a counterbore 84 extending from the inside surface and between the passage 82 and the counterbore 84 there is secured the rubber covered and perforated pipe 86 which is adapted for continuously spraying electrolyte into the interior of the barrel.

The end of the passage 82 opposite the pipe 86 has connected therewith an elbow 88 that is connected by a length of flexible tubing 90 with a fitting 92 which is formed to cooperate with the fitting 24 that is connected with the discharge port of the pump 18. The flow passages in the fittings 24 and 92 preferably incline downwardly toward the center of the tank so that when the fittings 24 and 92 are separated and the electrolyte continues to flow it is directed downwardly and does not spray or splash over the edge of the tank. The faces 24a and 92a of the fittings 24 and 92 respectively constitute angularly disposed flat faced flanges which engage with one another to form a tight joint and are so arranged that the passage-ways through the fittings 24, 92 are aligned with one another.

The bushings 80 are also provided with a pair of bores as at 94 through which pass the flexible cables 96. The cables are covered with rubber or a suitable flexible insulating material and terminate in a metallic end portion 98 which makes contact with the workpieces. The end of one of the cables or danglers is indicated in Figure 6 wherein it will be seen that the cable proper is completely covered and terminates in a threaded end portion 100 to which is connected the metallic end portion 98. The portion 98 may thus be removed to have the plating removed therefrom or to be replaced by an end portion of a different size.

Each of the bushings 80 is formed with flats on the outer ends thereof which are received between the legs 102 of the barrel supporting frame. These legs are better illustrated in Figure 5 and comprise vertical metallic members having the laterally extending feet 104 and being covered with rubber or any other suitable corrosion resistant insulating material to at least beyond the maximum height of solution in the tank. The legs extend beyond the bottom of the barrel so that when the barrel is removed from the tank and placed on the floor the feet form supporting members for the frame and barrel. When the barrel is within the tank the feet are above the bottom of the said tank and the legs 102 form a guiding channel for maintaining the barrel in its proper position and for holding the bushings 80 against rotation.

The legs 102 extend upwardly and are connected as by the brackets 106 to a common channel member 108 which extends from end to end of the tank. Secured between the legs 102 and beneath the channel 108 are a pair of blocks 110 which journal the shafts 112 and 114, the shafts being drivingly connected by a sleeve 116 which is keyed to both thereof. Each of the shafts 112, 114 have keyed thereto a pulley 118 around which pass the belts 120 that also engage the pulleys 74 of the workpiece holding barrel. The pulleys 118 and belts 120 together with the pulleys 74 provide a support for the barrel and rotate the said barrel while it is located in position within the tank by the engagement of the legs 102 by the bushings 80.

Keyed to the left end of the shaft 112 is a clutch member 122 which is adapted for engagement with the clutch half 60 when it is in its left end, or Figure 4 position. When the clutch half 122 is moved rightwardly it is disengaged from the clutch half 60 and the barrel and frame therefor may be lifted from the tank. The clutch half 122 has a groove around its outer periphery which is engaged by a pin or pins carried on a fork 124 which is pivoted at 126 on one of the brackets 106. A spring at 128 between the fork 124 and the channel 108 continuously urges the fork and clutch half 122 toward engagement with the clutch half 60.

For actuating the clutch fork 124 there is provided the bolt 130 that extends through the channel 108 and has the spaced washers 132 positioned on either side of an arm 134 on the said fork. The upper end of the bolt 130 has an eye 136 and when the bolt 130 is moved vertically by the bar 138 that extends through the eye 136 the fork 124 is rotated in a counterclockwise direction to disengage the clutch half 122 from the clutch half 60.

The channel 108 has fixedly mounted thereon a second eye 140 through which the bar 138 also passes and an eye 142 on the said bar provides means whereby a hoist may be connected with the barrel supporting frame to lift the entire assembly from the tank.

Preferably, the fork 124 includes a pair of arms 144 that are pivotally connected with the fitting 92 so that the fitting 92 is moved away from the fitting 24 when the barrel supporting frame is lifted and is urged toward the fitting 24 when the barrel frame is in position in the tank. To support and align the barrel supporting frame relative to the tank, the left end of the channel 108 has secured thereto a bar 146 that carries a pair of adjustable aligning studs 148 which pass through corresponding apertures in the flange 28 of the tank. The opposite end of the channel 108 has connected therewith a bracket 150 which loosely supports a V-shaped block 152 as by the bolt 154 which passes through the insulating bushings 156. The block 152 has connected therewith means as at 158 for receiving the ends of the cables 96.

The V in the block 52 opens downwardly and there is mounted on the flange 28 directly beneath the block 152 a block 160 which engages with the V of the block 152 and supports the frame and simultaneously affects electrical contact with the block 152.

The frame is preferably aligned with the tank at the right end of Figure 4 by the aligning studs 162 which are shown in Figures 3 and 8 and which are similar to the aligning studs 148 at the left end of the tank in Figure 4.

The belts 120 which run over the pulleys 118 and 74 are preferably rubber covered to prevent the weakening thereof through contact with the solution in the tank and have their engagement with the pulleys 118 enhanced by a series of ribs 164 substantially parallelly arranged around the working surface of the said pulleys, as shown in Figure 10. By means of the ribs or cogs 164 the workpiece holding barrel may be driven in rotation even when a fairly heavy load of workpieces is carried therein.

A modification of the construction is illustrated in Figure 11 wherein the workpiece holding barrel indicated at 200 is journaled in a block 202 that is fastened between the legs of the frame as by the rubber covered bolts 204. For driving the drum there is provided a ring gear 206 which is fastened to the barrel by the rubber covered screws 208 and which is formed of any material strong enough for the purpose of driving the barrel in rotation while being resistant to the solution in the tank. For example, a hard rubber or Bakelite would be satisfactory for the gear 206. The gear 206 is engaged by a pinion 208 on the shaft 112, the shaft being journalled, as before, in the block 110 secured between the legs of the frame. The block 110, however, receives additional support from an adjusting screw 210 which passes through the channel 108 and threadedly engages the said block. By means of the adjusting screw at 210 the gears 208 and 206 may be moved into the most advantageous meshing engagement.

In the modification of Figure 11 the drive at the right hand end of the barrel can be eliminated because of the positive engagement of the driving pinion and ring gear.

Electrolyte is pumped into the circulating pipe within the barrel through the supporting bushing 202 which is abutted by a stationary fitting 212 that is spring urged rightwardly by a pair of oppositely arranged torsion springs 214 which are anchored in the fixed portion 216 of the fitting which extends through the tank wall to be connected with the discharge side of the circulating pump. The members 202 and 212 may comprise cooperating cam surfaces so that when the barrel and frame are lowered into the tank the cam surfaces engage and urge the member 212 leftwardly to permit the mating surfaces of the said members to fit closely together.

Figure 13 illustrates still another modification wherein the barrel drive motor 300 is mounted on the frame 302 that supports the workpiece holding barrel 304, the entire assembly being lifted from the tank 306 when it is desired to place the workpieces in another solution or to remove them. In the modification shown in Figure 13, it would be necessary to either make connections with the motor 300 when the frame 302 was lowered into the tank or to connect the motor 300 through trolley means so that the assembly could be moved from tank to tank during a process.

It will be apparent that this invention provides means for processing small workpieces in large quantities through a single process step or through a plurality thereof with a minimum of handling of the said workpieces. Also, the processing of the workpieces, such as plating, is uniform because the workpieces are continuously tossed in the barrel and the electrolyte is continuously circulated thereover.

By employing an arrangement such as is shown in the drawings, any work cycle may be predetermined by an arrangement of individual tanks and workpieces passed therethrough without the necessity of designing special apparatus. Also, if, in a process of several steps in which there are several solution tanks it becomes necessary to eliminate one of the steps or to remove one of the tanks from service, this may readily be accomplished without interfering with other steps of the process and without halting the flow of workpieces.

It will be understood that this invention is susceptible to modification in order to adopt it to different usages and conditions and, accordingly, it is desired to comprehend such modifications within this invention as may fall within the scope of the appended claims.

I claim:

1. In an electroplating apparatus; an electrolyte holding tank; a horizontal member resting on the edges of said tank; a frame carried by said member; downwardly extending legs carried by said frame; a workpiece container rotatable between said legs; a horizontal countershaft journaled in said frame and means supporting said container from said shaft and for driving said container by said shaft; a drive shaft on said tank in alignment with said countershaft but spaced therefrom; clutch means carried by said shafts and yieldingly urged into driving engagement; lifting means associated with said frame for lifting the same together with said container from said tank; and means responsive to the exertion of lifting force on said lifting means for automatically disengaging said clutch members.

2. In a processing apparatus for simultaneously agitating and bathing a plurality of small workpieces; a tank containing the solution in which the workpieces are to be bathed; a frame removably supported by the upper edge of said tank; a workpiece container suspended from said frame in said solution; a shaft on said frame and means drivingly connecting said shaft and said container; a circulating pipe associated with said container and having a fitting in communication therewith outside of said container; a drive shaft carried by said tank for driving the shaft on said frame; clutch means connecting said shafts; a fitting carried by said tank for engagement with the first mentioned of said fittings to supply solution under pressure to said pipe; a lever connected with said clutch means and one of said fittings and having yielding means continuously urging said fittings into engagement and said clutch means into driving relationship; a lifting bar carried by said frame and having limited movement relative thereto; and means connecting said bar with said lever whereby the first movement of said bar as said frame is lifted will disengage the clutch means and said fittings.

3. In an apparatus for processing small workpieces; a container substantially a regular polygon in cross-section; a frame having spaced legs between which said container is rotatable; a sleeve at each end of said container on which said container is rotatable and which are held against rotation by said frame while being vertically movable relative thereto; means of circulating solution through one of said members to workpieces within said cleaner; a pulley secured to said container at each end thereof; a shaft on said frame parallel to the axis of rotation of said container and having pulleys in alignment with the pulleys at each end of said container; belts passing around said pulleys for simultaneously supporting and driving said container; and means of enhancing the gripping power of the pulleys on said shaft comprising a plurality of spaced beads on the working surfaces thereof.

4. In an apparatus especially adapted for electroprocessing small workpieces: an electrolyte tank; a perforated workpiece holding container; a frame to support said container having legs to support the frame when outside of the tank and bracket means to support the frame on the tank when placed therein; cathode elements having one terminal in the container to contact workpieces and another terminal carried by the frame; an electrolyte circulating pipe extending into said container and having a fitting at one end; a drive shaft journalled on said frame and connected to drive said container in rotation; a pump having its inlet connected to draw electrolyte from said tank; another fitting in said tank at the said one end of the container connected with the pump outlet to expel electrolyte into said tank; a drive motor carried by said tank; a lifting member for said frame and container hav-
ing a lost motion connection with said frame; a clutch for connecting said motor with said shaft; connections between said member and clutch and one of said fittings for automatically disengaging said motor from said shaft and said fittings from each other upon movement of said member in its lifting direction and before lifting movement of said frame and container commence; and a cathode connection on said tank positioned to engage and make electrical contact with the cathode terminal on said frame when the said frame is supported on the tank.

5. In an electroplating apparatus; an electrolyte holding tank; a horizontal frame member resting on opposite edges of said tank; downwardly extending legs carried by said frame member; a workpiece holding container substantially polygonal in cross-section rotatable between said legs; a horizontal shaft carried by said legs and means connecting said shaft with said container for driving the container in rotation when said shaft is driven; members extending into said container from either end thereof and held against rotation by said legs; a perforated electrolyte circulating pipe supported between said members and a fitting outside of said container in communication with said pipe; a fitting carried by said tank communicating with the first mentioned of said fittings to supply electrolyte thereto under pressure; a drive shaft carried by said tank and clutch means engaging said drive shaft with said horizontal shaft; lifting means carried by said frame member and movable relative thereto; a lever operated by the movement of said lifting means; and means connecting said lever with said clutch means and said fitting in communication with the perforated electrolyte circulating pipe for effecting disengagement thereof when lifting force is exerted on said lifting means.

6. In an electroplating apparatus; an electrolyte holding tank; a horizontal frame resting on the edges of said tank; downwardly extending legs carried by said frame; a workpiece container rotatably supported between said legs; a horizontal countershaft journaled in said frame and means for driving said container by said shaft; a drive shaft on said tank in axial alignment with said countershaft but spaced therefrom; clutch means carried by said shafts and yieldingly urged toward driving engagement; lifting means associated with said frame for lifting the same together with said container from said tank and having a lost motion connection with said frame; and means responsive to the taking up of the lost motion in said connection when said frame is to be lifted from said tank for disengaging said clutch members.

MATTHEW LANG.

REFERENCES CITED

The following references are of record in the file of this patent:

UNITED STATES PATENTS

| Number | Name | Date |
|---|---|---|
| 639,766 | Porter | Dec. 26, 1899 |
| 1,095,328 | Jordan | May 5, 1914 |
| 1,207,283 | Enghauser | Dec. 5, 1916 |
| 1,310,662 | Kellington | July 22, 1919 |
| 1,541,454 | Wells | June 9, 1925 |
| 1,848,391 | Simpson | Mar. 8, 1932 |
| 1,916,465 | Dawson | July 4, 1933 |
| 2,035,633 | Bogle | Mar. 31, 1936 |
| 2,249,609 | Jackson | July 15, 1941 |